US008738166B2

(12) United States Patent
Abe et al.

(10) Patent No.: US 8,738,166 B2
(45) Date of Patent: May 27, 2014

(54) METHOD FOR MANUFACTURING THREE-DIMENSIONAL SHAPED OBJECT AND THREE-DIMENSIONAL SHAPED OBJECT OBTAINED BY THE SAME

(75) Inventors: Satoshi Abe, Osaka (JP); Masataka Takenami, Osaka (JP); Isao Fuwa, Osaka (JP); Yoshikazu Higashi, Shiga (JP); Norio Yoshida, Nara (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 13/202,827

(22) PCT Filed: Feb. 23, 2010

(86) PCT No.: PCT/JP2010/053188
§ 371 (c)(1),
(2), (4) Date: Oct. 12, 2011

(87) PCT Pub. No.: WO2010/098479
PCT Pub. Date: Sep. 2, 2010

(65) Prior Publication Data
US 2012/0041586 A1 Feb. 16, 2012

(30) Foreign Application Priority Data
Feb. 24, 2009 (JP) ................................ 2009-040860

(51) Int. Cl.
*G06F 19/00* (2011.01)
(52) U.S. Cl.
USPC .................................. 700/120; 249/78; 419/7
(58) Field of Classification Search
USPC .................................. 700/120; 249/78; 419/7
See application file for complete search history.

(56) References Cited

U.S. PATENT DOCUMENTS

| 5,932,059 | A  | * | 8/1999  | Langer et al. ............... 156/275.5 |
| 6,350,403 | B1 | * | 2/2002  | Melisaris et al. ............. 264/401 |
| 6,657,155 | B2 | * | 12/2003 | Abe et al. ................... 219/121.6 |
| 7,255,830 | B2 |   | 8/2007  | Abe et al. |
| 7,323,132 | B2 |   | 1/2008  | Abe et al. |
| 2004/0228754 | A1 | * | 11/2004 | Abe et al. ........................... 419/6 |

(Continued)

FOREIGN PATENT DOCUMENTS

| DE | 10065594 | 5/2002 |
| DE | 10344901 | 5/2004 |

(Continued)

OTHER PUBLICATIONS

Extended European Search Report dated Mar. 12, 2014.

*Primary Examiner* — Mohammad Ali
*Assistant Examiner* — Anthony Whittington
(74) *Attorney, Agent, or Firm* — Greenblum & Bernstein, P.L.C.

(57) ABSTRACT

There is provided a method for manufacturing a three-dimensional shaped object. The method of the present invention comprises the repeated steps of: (i) forming a solidified layer by irradiating a predetermined portion of a powder layer on a base plate with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam; wherein the solidified layers are formed such that they have a high-density portion whose solidified density is 95 to 100% and a low-density portion whose solidified density is 0 to 95% (excluding 95%); and wherein the high-density portion is a portion of the three-dimensional shaped object, to which the force is applied when the three-dimensional shaped object is used.

10 Claims, 12 Drawing Sheets

(56) References Cited

U.S. PATENT DOCUMENTS

| | | |
|---|---|---|
| 2005/0072519 A1* | 4/2005 | Johnson et al. ............ 156/275.5 |
| 2005/0112230 A1 | 5/2005 | Herzog |
| 2007/0241482 A1* | 10/2007 | Giller et al. .................. 264/494 |
| 2007/0256781 A1* | 11/2007 | Johnson et al. ............ 156/275.5 |
| 2008/0169589 A1* | 7/2008 | Sperry et al. .................. 264/494 |
| 2009/0121393 A1 | 5/2009 | Abe |

FOREIGN PATENT DOCUMENTS

| | | |
|---|---|---|
| EP | 1949989 | 7/2008 |
| JP | 1-502890 | 10/1989 |
| JP | 8-504139 | 5/1996 |
| JP | 2000-73108 | 3/2000 |
| JP | 2000-190086 | 7/2000 |
| JP | 2001-277368 | 10/2001 |
| JP | 2002-322501 | 11/2002 |
| JP | 2004-142427 | 5/2004 |
| JP | 2008-231490 | 10/2008 |
| JP | 2008-280582 | 11/2008 |
| JP | 2009-1916 | 1/2009 |
| WO | 88/02677 | 4/1988 |
| WO | 2004/004955 | 1/2004 |

* cited by examiner (a)

(b)

(a)

(b)

(a) High-density portion (Melting)

Solidified density: 99.8%

(b) Low-density portion

Solidified density: 75.1%

Porous hole

US 8,738,166 B2

METHOD FOR MANUFACTURING THREE-DIMENSIONAL SHAPED OBJECT AND THREE-DIMENSIONAL SHAPED OBJECT OBTAINED BY THE SAME

TECHNICAL FIELD

The present invention relates to a method for manufacturing a three-dimensional shaped object, and also relates to the three-dimensional shaped object. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to the three-dimensional shaped object obtained by such manufacturing method.

BACKGROUND OF THE INVENTION

Heretofore, a method for manufacturing a three-dimensional shaped object by irradiating a powder with a light beam has been known (such method can be generally referred to as a "selective laser sintering method"). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated the contour shape in a short period of time.

According to the selective laser sintering method, a three-dimensional shaped object is often manufactured in a chamber maintained under an inert atmosphere from the viewpoint of the prevention of oxidation or the like. By way of the case of using a metal powder as a powder material and using the resulting three-dimensional shaped object as metal mold, as shown in FIG. 1, a powder layer 22 with a predetermined thickness t1 is firstly formed on a base plate for shaped object 21 (see FIG. 1(a)) and then a predetermined portion of a powder layer 22 is irradiated with a light beam to form a solidified layer 24 on base plate for shaped object 21. Then, a powder layer 22 is newly provided on the solidified layer 24 thus formed and is irradiated again with the light beam to form another solidified layer. In this way, when the solidified layer is repeatedly formed, it is possible to obtain a three-dimensional shaped object with a plurality of solidified layers 24 stacked integrally (see FIG. 1(b)). The solidified layer corresponding to a bottom layer can be formed in a state of being adhered to the surface of the base plate for shaped object. Therefore, the three-dimensional shaped object and the base plate for shaped object are mutually integrated. The integrated "three-dimensional shaped object" and "base plate for shaped object" can be used as a metal mold as they are.

Herein, the three-dimensional shaped object is manufactured by irradiation with a light beam and is therefore considerably influenced by heat attributable to the light beam. Specifically, the portion to be irradiated of the powder layer is once melted to become a molten state, and then a solidified layer is formed when such portion is solidified. However, a shrinkage phenomenon can occur upon the solidification. In particular, the shrinkage phenomenon occurs when the molten powder is solidified due to a cooling thereof (see FIG. 2(a)). While on the other hand, a base plate for shaped object 21, which supports the solidified layer (i.e., three-dimensional shaped object), is a rigid body made of a steel material or the like and is distant from the position to be irradiated with the light beam. Therefore, the base plate for shaped object 21 is substantially less likely to be influenced by heat attributable to the light beam. As a result, an upward warping force (moment) is generated in the three-dimensional shaped object 24 on the base plate for shaped object. When this upward warping force exceeds a certain limit, there occurs a phenomenon in which the three-dimensional shaped object 24 peels from the base plate for shaped object 21 upon manufacturing, as shown in FIG. 2(b). The upward warp of the three-dimensional shaped object and the peeling thereof from the base plate are not desirable since it becomes difficult to manufacture a desired three-dimensional shaped object. For example, when the three-dimensional shaped object (i.e., solidified layer) warps upward, it becomes impossible to achieve a shape accuracy of the resulting three-dimensional shaped object. Also, when it becomes impossible to newly provide a powder layer with a predetermined thickness on the solidified layer due to the upward warping of the solidified layer (e.g., when the solidified layer warps upward to the extent more than the thickness of a powder layer to be newly provided), it will become impossible to uniformly provide the new powder layer by the squeegee process.

A manufacturing method as described in JP-T-8-504139 has been proposed as the method in which consideration is made on shrinkage of a three-dimensional shaped object. According to such manufacturing method, a three-dimensional shaped object is manufactured so that an inner core portion and an outer shell portion are separately formed (see FIG. 17). Since the outer shell portion has a solidified density higher than that of the inner core portion, a formation of the outer shell portion requires a high energy and also takes a longer time. In the invention of JP-T-8-504139, consideration is not made on a final use application of the shaped object and the outer shell portion, and only forms a "shell" as its name suggests. Therefore, in the invention of JP-T-8-504139, the entire periphery of the three-dimensional shaped object is coated with a material with a generally uniform thickness (see FIG. 17) and it is by no means satisfactory from the viewpoint of the manufacturing cost and time.

DISCLOSURE OF THE INVENTION

Under these circumstances, the present invention has been created. That is, an object of the present invention is to provide a "method for manufacturing a three-dimensional shaped object" which not only prevents warp deformation of the resulting three-dimensional shaped object, but also enables more reduced manufacturing time and manufacturing cost.

In order to achieve the above object, the present invention provides a method for manufacturing a three-dimensional shaped object, the method comprising the repeated steps of:

(i) forming a solidified layer by irradiating a predetermined portion of a powder layer on a base plate for shape object with a light beam (for example, a directional energy beam such as laser beam), thereby allowing sintering of the powder in the predetermined portion or melting and subsequent solidification thereof; and (ii) forming another solidified layer by newly forming a powder layer on the resulting solidified layer, followed by the irradiation of a predetermined portion of the powder layer with the light beam;

wherein the solidified layers are formed such that they have a high-density portion whose solidified density is 95 to 100% and a low-density portion whose solidified density is 0 to 95% (excluding 95%); and wherein the high-density portion is a portion of the three-dimensional shaped object, to which the force is applied when the three-dimensional shaped object is used. Preferably, the high-density portion is formed due to a complete melting of the powder irradiated with the light beam in the predetermined portion.

For one thing, the manufacturing method of the present invention is characterized in that the high-density portion is formed only at required position. More specifically, the high-density portion is formed only in a portion (in some cases, portion in the vicinity of the portion) of the three-dimensional shaped object, to which the force is applied when the three-dimensional shaped object is used.

As used in this description and claims, the term "high-density portion" refers to so-called "melting" (i.e., a portion formed by solidification after a substantially complete melting of a powder constituting a powder layer). That is, the term "high-density portion" substantially means a portion, through which a fluid such as liquid or gas does not pass, because of its very high solidified density (i.e., solidified density of about 95 to 100%).

As used in this description and claims, the term "force" means a force attributable to a pressure of a fluid or the like, a force attributable to contact, a force attributable to a friction force and the like. For example, the term "force" substantially means a force applied to a three-dimensional shaped object when a resin material, cooling water, oil and/or steam are in contact with the three-dimensional shaped object.

Describing just for confirmation, the term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of a three-dimensional shaped object. The term "solidified layer" substantially means "sintered layer" when the powder layer is a metal powder layer, whereas it substantially means "cured layer" when the powder layer is a resin powder layer.

The solidified density of a high-density portion is about 95 to 100%, preferably 98% to 100%, and more preferably about 100% substantially. As the solidified density of the high-density portion becomes higher, there is provided a higher strength of the shaped object with respect to the force to be applied when the shaped object is used. While on the other hand, the low-density portion may have any solidified density as long as the solidified density is 0 to 95% (excluding 95%) and the solidified density may be determined taking the function, manufacturing time, manufacturing cost and the like of the three-dimensional shaped object into consideration. For example, the low-density portion has the solidified density of 70 to 90%, and may in some cases have the solidified density lower than "70 to 90%".

In one preferred embodiment, the high-density portion is formed in a part of the surface region of the three-dimensional shaped object. In other words, "melting" is formed only in such surface region, to which "force" is applied. When the three-dimensional shaped object integrated with the base plate for shaped object is used as the product without being separated from each other, the high-density portion may be formed in the portion which is in contact with the base plate for shaped object. In such case, at least one high-density portion 'c' may be formed in the interior portion of the three-dimensional shaped object such that "high-density portion 'a' formed in a part of the surface region" and "high-density portion 'b' formed in the portion which is in contact with the base plate for shaped object" are mutually connected.

In another preferred embodiment, the high-density portion is formed in a part of the interior portion of the three-dimensional shaped object. In other words, when a portion to which "force" is applied (e.g., a wall portion of a cooling water channel of a metal mold) is provided in the inner portion of the shaped object, such portion is configured to be "high-density portion"/"melting".

In still another preferred embodiment, the high-density portion is formed in the portion which would be a heat-transfer portion when the three-dimensional shaped object is used. In other words, the surface, which is in contact with a substance having a high temperature or low temperature, is configured to be "high-density portion"/"melting".

The present invention also provides a three-dimensional shaped object obtained by the aforementioned manufacturing method. In particularly preferred embodiment, such three-dimensional shaped object can be used as a metal mold. A cavity-forming surface (i.e., wall surface in the interior of a metal mold which enables a formation of a molded article) of a metal mold corresponds to "high-density portion formed in a part of the surface region of the three-dimensional shaped object". Also, a wall portion of a cooling water channel of the metal mold can correspond to "high-density portion formed in a part of the interior portion of the three-dimensional shaped object". Furthermore, the portion to which the force is applied when the metal mold is used may correspond to the "joint portion of a high-density portion 'a' and a high-density portion 'c' of the three-dimensional shaped object".

EFFECT OF THE INVENTION

In accordance with the present invention, the high-density portion is formed only at required position, and thereby making it possible to shorten the manufacturing time and also to reduce the proportion of the high-density portion which essentially requires a high energy for the formation thereof. This leads to an achievement of the reduction of the manufacturing cost of the shaped object.

According to the manufacturing method of the present invention, there is provided a reduced proportion of the high-density portion in the entire three-dimensional shaped object, since the high-density portion is formed only at required position. Therefore, in light of the fact that the high-density portion is considered "portion where a shrinkage ratio is comparatively large due to a cooling and subsequent solidification of the molten powder", the present invention can produce the three-dimensional shaped object with a percentage of the large shrinkage portion being kept as low as possible. This can contribute to a prevention or reduction of an upward warping of the three-dimensional shaped object, thus making it possible to prevent the three-dimensional shaped object (i.e., solidified layer) from peeling from the surface of the base plate. In other words, not only it becomes possible to newly provide a powder layer with a predetermined thickness on the solidified layer, but also a shape accuracy of the obtained three-dimensional shaped object is improved.

Furthermore, it was inevitably required in the prior art to design on preliminary assumption of phenomena such as "upward warping" and "peeling" in order to achieve the shape accuracy of the three-dimensional shaped object. However, it is possible according to the present invention to prevent "upward warping" and "peeling" while reducing the manufacturing time and manufacturing cost only by providing the high-density portion at a required position of the shaped object. In other words, the present invention is also very useful in that it is possible to suitably design the shaped object while preventing an increase in the manufacturing time and manufacturing cost in spite of those unpredictable phenomena.

Figure 1:
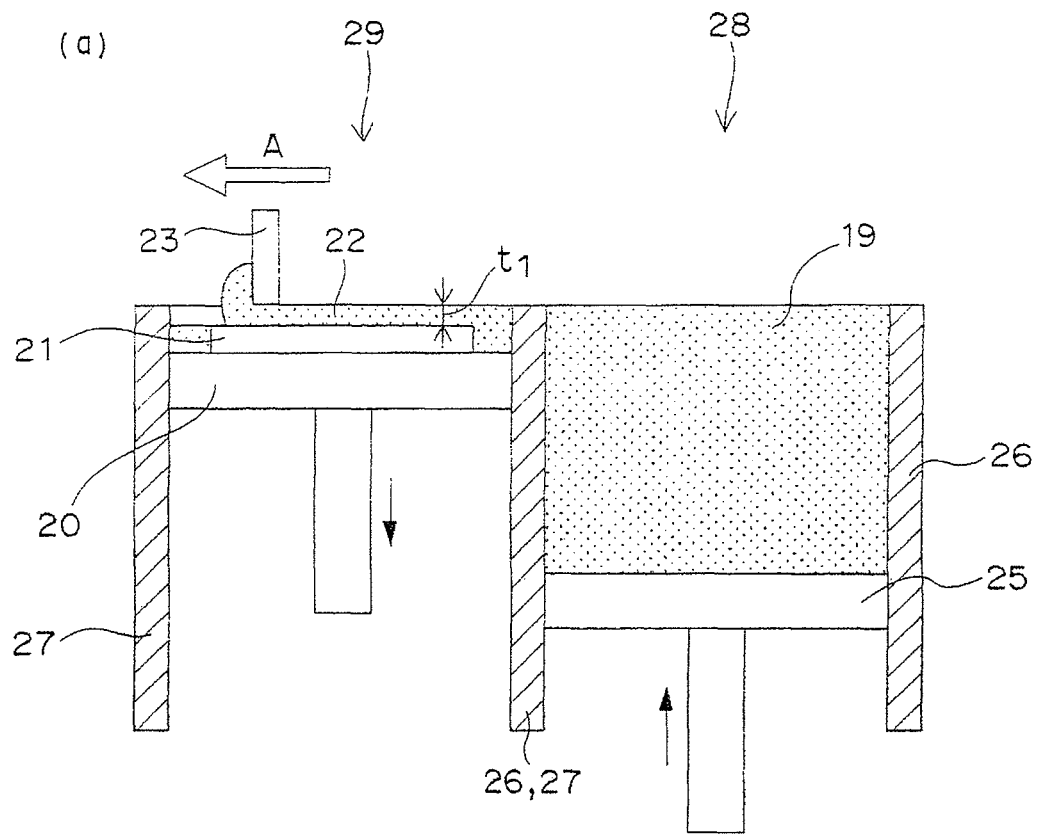
FIG. 1 is a sectional view schematically showing operations of a laser-sintering/milling hybrid machine.
Figure 1:
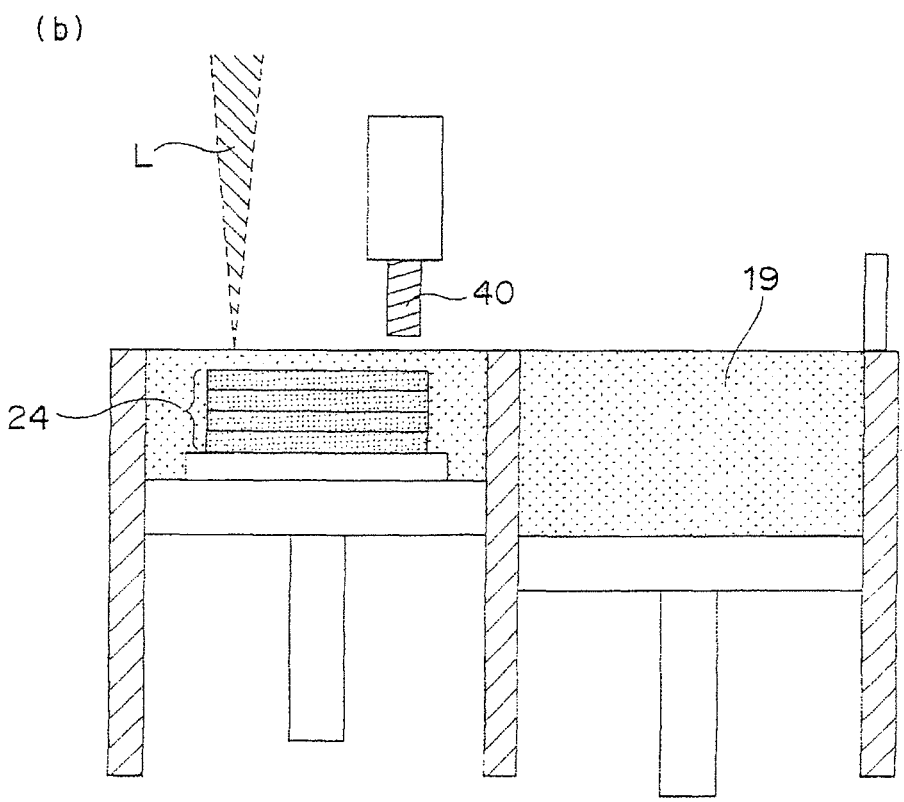
Figure 2:
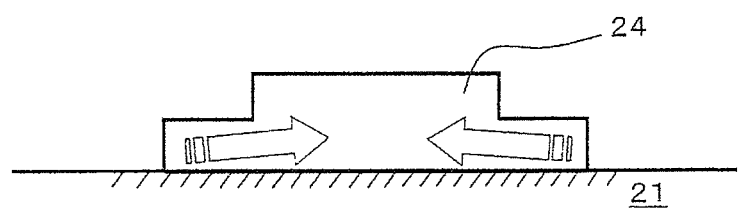
FIG. 2 is a sectional view schematically showing a phenomenon which causes an upward warping or peeling of a three-dimensional shaped object.
Figure 2:
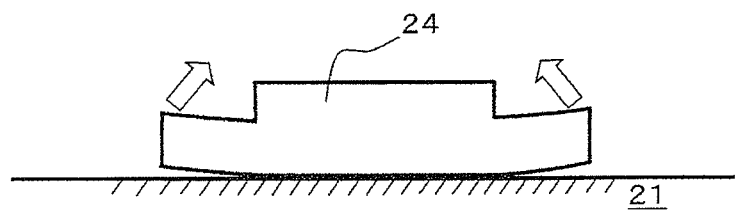

In the drawings, the reference numerals correspond to the following elements:
1 Laser-sintering/milling hybrid machine
2 Powder layer forming means
3 Laser-beam irradiation means
4 Milling means
19 Powder/powder layer (e.g., metal powder/metal powder layer or resin powder/resin powder layer)
20 Forming table
21 Base plate for shaped object
22 Powder layer (e.g., metal powder layer or resin powder layer)
23 Squeegee blade
24 Solidified layer (e.g., sintered layer or cured layer) or three-dimensional shaped object obtained therefrom
24' High-density portion (high-density melting)
24'a High-density portion (high-density melting, for example "cavity-forming surface of metal mold")
24'b High-density portion (high-density melting, for example "high-density portion formed at the surface boundary with respect to plate")
24'c High-density portion (high-density melting, for example "high-density portion having cell structure or truss structure")
24'd High-density portion (high-density melting, for example "wall of cooling water channel of metal mold")
24" Low-density portion
25 Powder table
26 Wall of storage tank for powder material
27 Wall of forming tank
28 Storage tank for powder material
29 Forming tank
30 Light beam generator
31 Galvanometer mirror
32 Reflecting mirror
33 Collecting lens
40 Milling head
41 X-Y actuator
41a X-axis actuator
41b Y-axis actuator
42 Tool magazine
50 Chamber
52 Window for transmission of light
L Light beam
P "Force" applied to three-dimensional shaped object in use

BEST MODES FOR CARRYING OUT THE INVENTION

Figure 3:
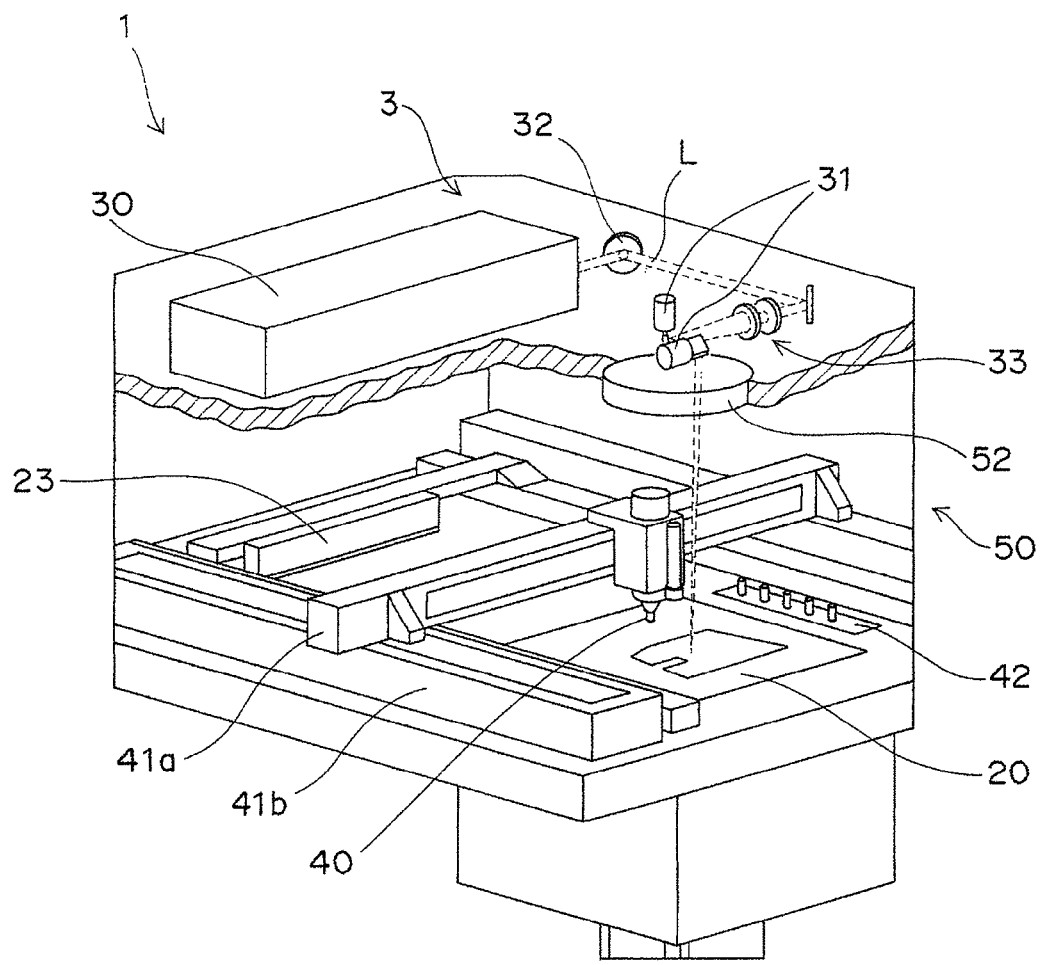
FIG. 3 is a perspective view schematically showing an embodiment in which a selective laser sintering method is carried out.
Figure 4:
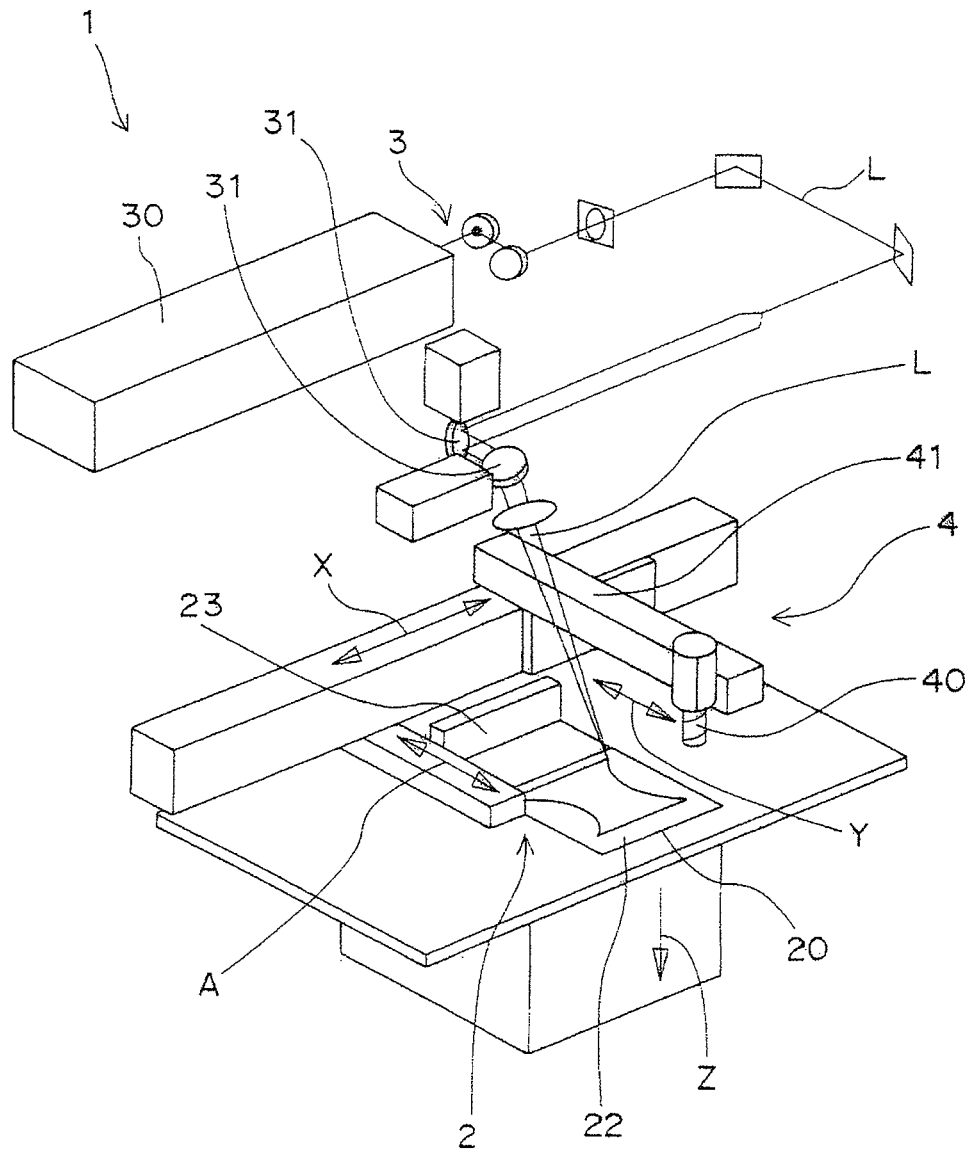
FIG. 4 is a perspective view schematically showing a constitution of a laser-sintering/milling hybrid machine by which a selective laser sintering method is carried out.

The present invention will be hereinafter described in more detail with reference to the accompanying drawings.
[Selective Laser Sintering Method]
First, a selective laser sintering method, on which the manufacturing method of the present invention is premised, will be described. FIG. 1, FIG. 3 and FIG. 4 show functions and constitutions, which enable execution of the selective laser sintering method, of a laser-sintering/milling hybrid machine 1. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/ descending by cylinder drive in a forming tank 29 whose outer periphery is surrounded with a wall 27"; a "base plate for shaped object 21 which is disposed on the forming table 20 and serves as a platform of a shaped object"; a "laser-beam irradiation means 3 for irradiating an arbitrary position with an emitted light beam L"; and a "milling means 4 for milling the periphery of a shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on a base plate for shaped object". As shown in FIG. 3 and FIG. 4, the laser-beam irradiation means 3 is mainly composed of a "light beam generator 30 for emitting a light beam L" and a "galvanometer mirror 31 (scan optical system) for scanning a light beam L onto a powder layer 22". If necessary, the laser-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The milling means 4 is mainly composed of a "milling head 40 for milling the periphery of a shaped object" and an "X-Y actuator 41 (41a, 41b) for driving the milling head 40 to move toward the position to be milled (see FIG. 3 and FIG. 4).

Figure 5:
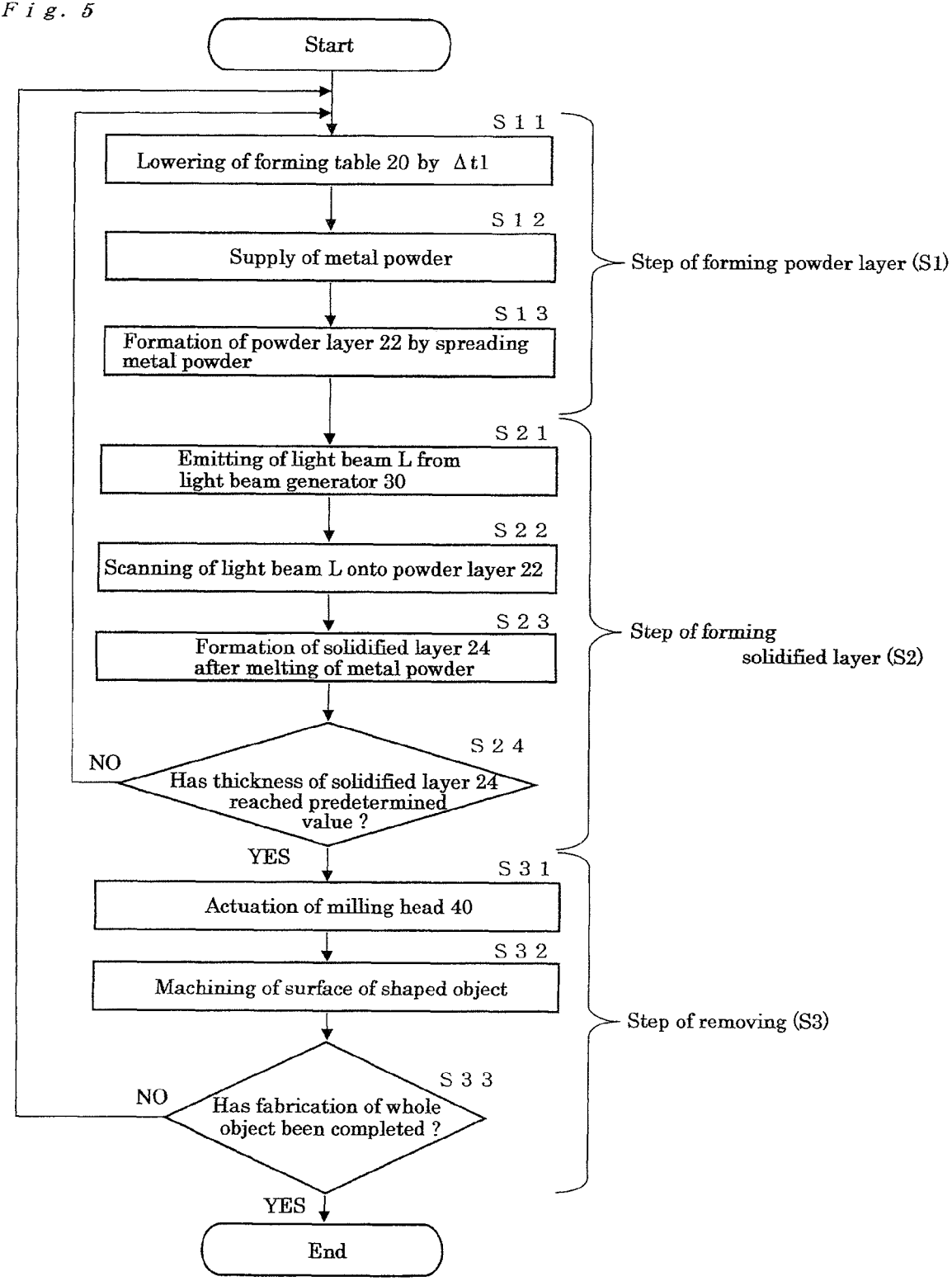
FIG. 5 is a flow chart of operations of a laser-sintering/milling hybrid machine.
Figure 6:
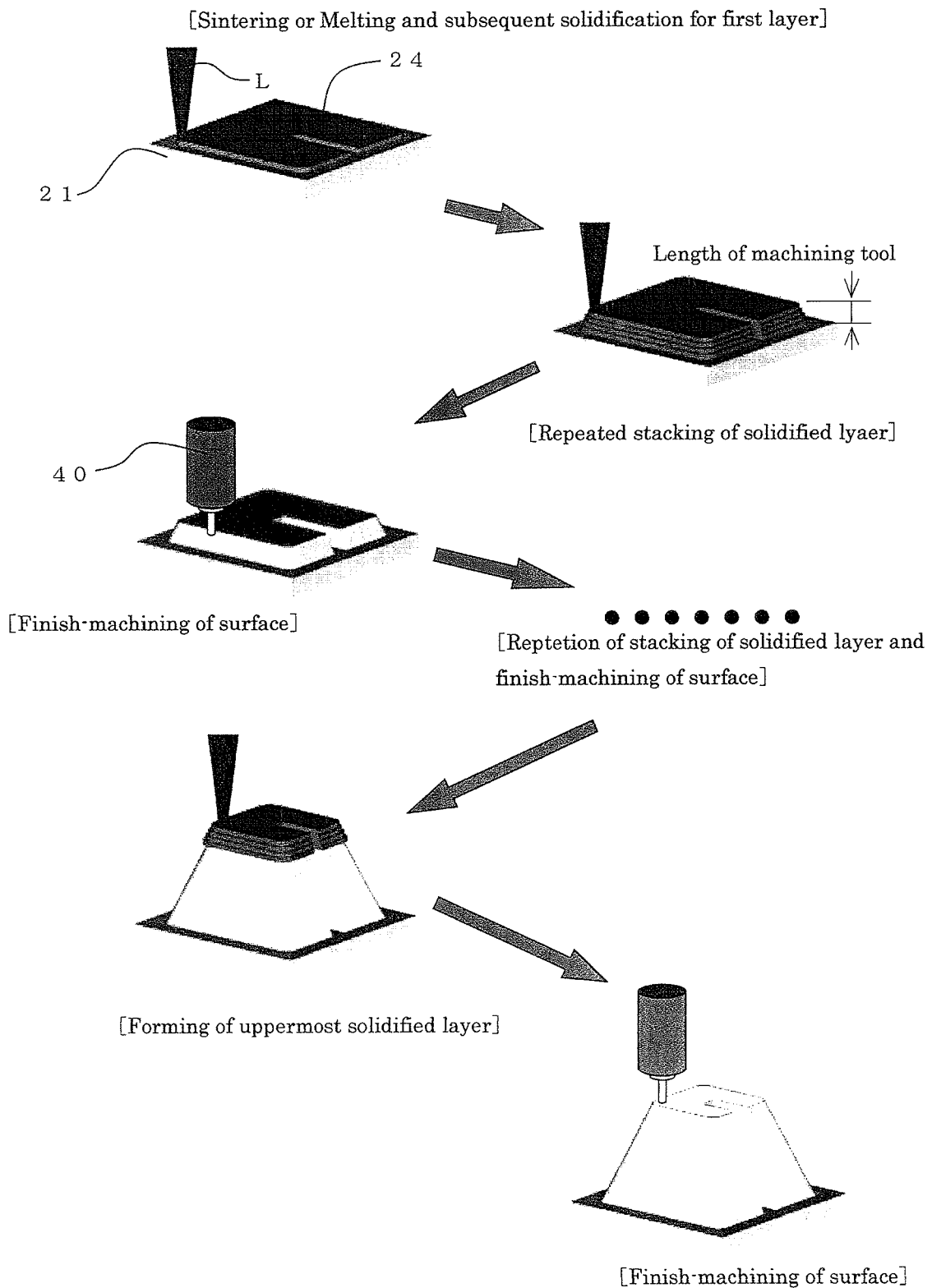
FIG. 6 is a schematic view showing a laser-sintering/milling hybrid process with a lapse of time.

Operations of the laser-sintering/milling hybrid machine 1 will be described in detail with reference to FIG. 1, FIG. 5 and FIG. 6. FIG. 5 shows an operation flow of a laser-sintering/ milling hybrid machine. FIG. 6 schematically and simply shows a laser-sintering/milling hybrid process.

The operations of the laser-sintering/milling hybrid machine are mainly composed of a powder layer forming step (S1) of forming a powder layer 22; a solidified layer forming step (S2) of irradiating the powder layer 22 with a light beam L to form a solidified layer 24; and a milling step (S3) of milling a surface of a shaped object. In the powder layer forming step (S1), first, the forming table 20 is descended by $\Delta t1$ (S11). Subsequently, a powder table 25 is elevated by $\Delta t1$, and thereafter the squeegee blade 23 is driven to move in the direction of arrow A as shown in FIG. 1(a). Whereby, a powder (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 is spread to form a powder layer 2 in a predetermined thickness $\Delta t1$ 2 (S13, while being transferred onto the base plate 21 (S12). Following this step, the solidified layer forming step (S2) is performed. In this the solidified layer forming step, a light beam L (e.g., carbon dioxide laser (500 W), Nd:YAG laser (500 W) or ultraviolet light) is emitted from the light beam generator 30 (S21) and then a light beam L is scanned onto an arbitrary position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may be transmitted by an optical fiber or the like.

The powder layer forming step (S1) and the solidified layer forming step (S2) are repeatedly performed until the thickness of the stacked layers 24 reaches a predetermined value that is obtained based on a tool length of the milling head 40 (see FIG. 1(b)). The solidified layer to be newly stacked is integrated with the lower solidified layer which has already been formed upon a sintering of the powder or a melting and subsequent solidification of the powder.

When the thickness of the stacked solidified layers 24 reaches a predetermined thickness, the milling step (S3) is initiated. A milling means to be used in the milling step may be a general-purpose numerical control (NC) machine tool or those analogous thereto. Particularly, a machining center (MC) capable of automatically replacing a milling tool (end mill) is preferred. As the end mill, a twin-bladed type ball end mill made of a superhard material may be mainly used. A square end mill, a radius end mill, drill or the like may also be used according to an intended shape or an object. In the embodiments as shown in FIG. 1 and FIG. 6, the milling head 40 is actuated to initiate execution of the milling step (S31). For example, in a case where the tool (ball end mill) of the milling head 40 has a diameter of 1 mm and an effective milling length of 3 mm, a milling in a depth of 3 mm can be performed. Therefore, when $\Delta t1$ is 0.05 mm, the milling head 40 is actuated when sixty solidified layers are formed. The milling head 40 is moved in X and Y directions by means of the X-Y actuator 41 (41a, 41b) and the surface of the shaped object composed of stacked solidified layers 24 is subjected to milling (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 6).

An irradiation path of the light beam L in the solidified layer forming step (S2) and a milling path in the milling step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when $\Delta t1$ is 0.05 mm) sliced sections of STL data produced from a 3-D CAD model, are used.

[Manufacturing Method of the Present Invention]

The manufacturing method of the present invention particularly takes into consideration applications (i.e., intended end-usage) of the three-dimensional shaped object obtained from the aforementioned selective laser sintering method. Specifically, the present invention is characterized in that the solidified layer is formed such that the surface to which a force is applied when the three-dimensional shaped object is used becomes "melting". In other words, the solidified layer is formed such that the "surface which is in contact with the other substance when the three-dimensional shaped object is used" becomes "melting".

In the following description, the present invention will be described by way of an embodiment using a "metal powder" as the powder. The "embodiment using a metal powder" corresponds to an "embodiment using a metal powder layer as a powder layer". By the way, the metal powder used in the present invention may be a powder containing an iron based powder as a main component, and may be a powder which further contains at least one kind selected from the group consisting of a nickel powder, a nickel based alloy powder, a copper powder, a copper based alloy powder and a graphite powder in some cases. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight.

Figure 7:
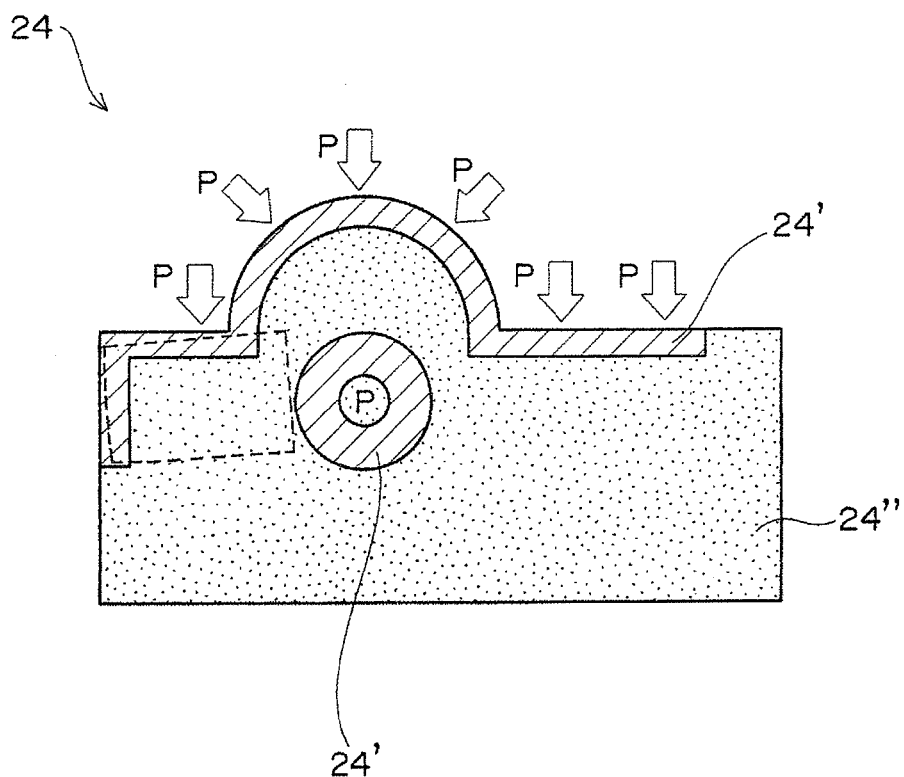
FIG. 7 is a schematic view schematically showing a feature of a three-dimensional shaped object obtained by the manufacturing method of the present invention.
Figure 8:
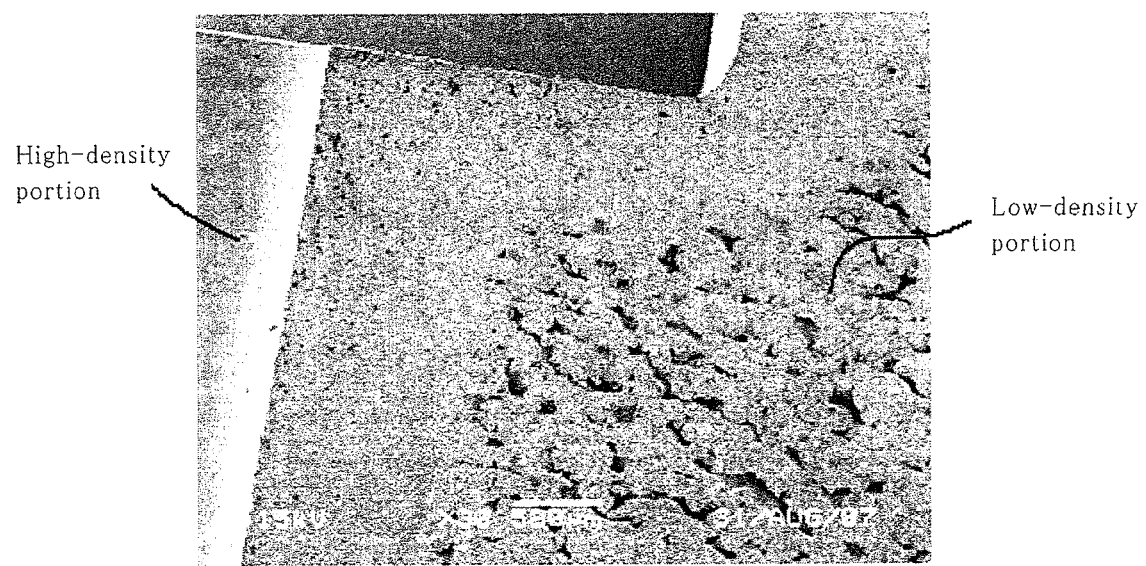
FIG. 8 is a SEM photograph (sectional photograph in a broken line portion of FIG. 7) of a three-dimensional shaped object obtained by the manufacturing method of the present invention.
Figure 9:
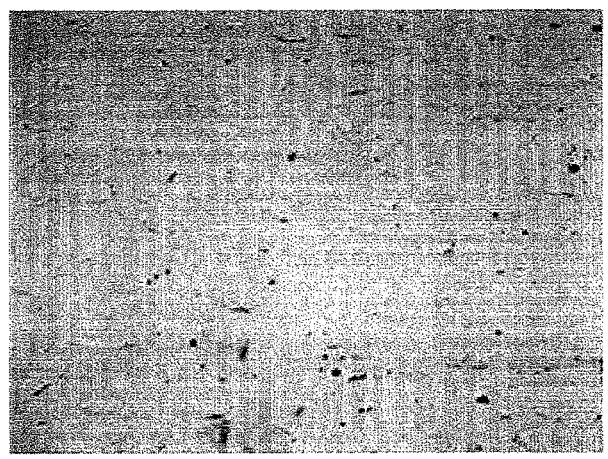
FIG. 9 is SEM photographs (sectional photograph of a three-dimensional shaped object) of a high-density portion (melting) and a low-density portion.
Figure 9:
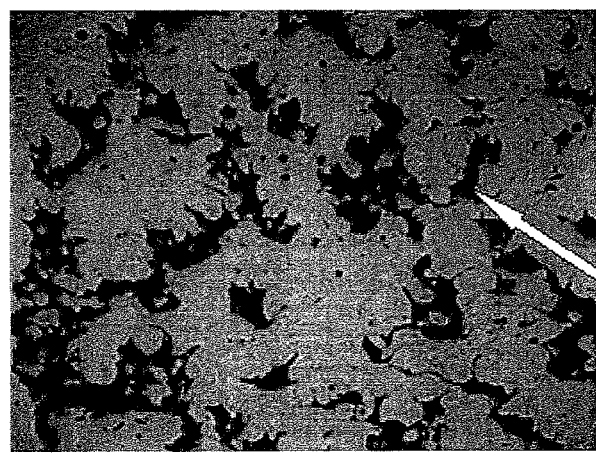

In the manufacturing method of the present invention, as shown in FIG. 7, the solidified layers are formed such that a portion thereof to which a force P is applied when the three-dimensional shaped object 24 is used corresponds to a high-density portion 24' whose solidified density is 95 to 100% and the other portion thereof corresponds to a low-density portion 24" whose solidified density is 0 to 95% (excluding 95%). It is particularly preferred to form the high-density portion (i.e., high-density melting) by completely melting the powder in the predetermined portion through the irradiation thereof with the light beam. FIG. 8 shows a SEM photograph of the boundary portion between the high-density portion and the low-density portion formed according to the manufacturing method of the present invention. FIG. 9 shows the respective sectional photographs (SEM photographs) of the high-density portion and the low-density portion.

In order to form the high-density portion, the complete melting of the powder may be allowed to occur by increasing an output energy of the light beam for irradiation. While on the other hand, in order to form the low-density portion, the complete melting of the powder may not be allowed to occur by decreasing the output energy of the light beam for irradiation. In addition to (a) increasing of output energy of the light beam, it is also possible to form the high-density portion by (b) lowering a scanning rate of the light beam, (c) narrowing scanning pitch of the light beam, and (d) decreasing a condensing diameter of the light beam. The aforementioned operations (a) to (d) may be performed alone, or performed in combination. Especially with respect to the aforementioned operation (a) for example, the high-density portion whose solidified density is 95 to 100% can be formed by adjusting an irradiation energy density E of the light beam in a range from about 4 to 15 J/mm$^2$. Similarly, it is also possible to form the low-density portion by (a) decreasing of the output energy of the light beam, (b) increasing a scanning rate of the light beam, (c) enlarging a scanning pitch of the light beam and (d) increasing a condensing diameter of the light beam. For example, the low-density portion whose solidified density is 70 to 90% can be formed by adjusting the irradiation energy density E of the light beam in a range from about 1 to 3 J/mm$^2$.

With respect to the 3-D CAD data of the laser-sintering/milling hybrid machine, two models, for example, a 3-D CAD model A of the high-density portion and a 3-D CAD model B of the low-density portion are prepared and the respective conditions are designated by assigning a role, and also a coordinate system defining where each model is formed is adjusted. In other words, when the density and strength of three-dimensional shaped object are varied, it becomes possible to vary the density and strength by dividing the model into corresponding sites in advance, using 3-D CAD or the like, and setting light beam irradiation conditions with respect to each model. This is more specifically mentioned as follows: An irradiation path of the light beam is made from data of a 3-D CAD model in advance and the contour shape data of each of sliced sections, which are regularly-pitched (e.g., 0.05 mm) sliced sections of STL data produced from the 3-D CAD model, are used. When the high-density portion and the low-density portion are formed, the 3-D CAD model is divided in advance into a portion which would serve as the high-density portion, and a portion which would serve as the low-density portion. Then, the contour shape data of each of sliced sections for the portion which would serve as the high-density portion, and the portion which would serve as the low-density portion are made, and a powder material is subjected to a sintering or a melting and subsequent solidification thereof by irradiating with the light beam at each portion by using of such data.

The high-density portion is a "dense portion" through which a fluid such as liquid or gas cannot pass. More specifically, the high-density portion can be a portion through which a fluid cannot pass under the condition when the shaped object is used. In such high-density portion, the solidified density is in the range of 95 to 100%, preferably in the range of 98% to 100%, and more preferably substantially about 100%. As the solidified density of the high-density portion becomes higher, there is provided a high drag force with respect to a force to be applied to the three-dimensional shaped object, the force being due to a resin, cooling water, oil and/or steam. The high-density portion can have various geometries depending on the use of the three-dimensional shaped object (particularly depending on a form of the force which would be applied when the shaped object is used). For example, when the high-density portion 24' has the form as shown in FIG. 7, the thickness may be uniform (e.g., about 0.01 mm to 10 mm) as shown in FIG. 7. However, the thickness of the high-density portion 24' is not limited to "uniform", and may be "un-uniform". Irrespective of "uniform thickness" or "un-uniform thickness", the thickness of the high-density portion may be varied depending on the intended function of the three-dimensional shaped object. While on the other hand, the solidified density of the low-density portion 24" (e.g., see FIG. 7) is 0 to 95% (not including 95%) and the low-density portion is a "coarse portion". The solidified density of the low-density portion may be finally determined taking the function, manufacturing time, manufacturing cost and the like of the three-dimensional shaped object into consideration. The solidified density of the low-density portion may be, for example, 70 to 90%, and may be lower than such range in some cases. For example, when the shaped object with a cell structure or truss structure (which will be described below) is manufactured, the solidified density may be 0%. This means that irradiation with the light beam is not particularly necessary for the formation of the low-density portion.

As used in this description and claims, the term "solidified density" substantially means a sintered sectional density (occupation ratio of a metallic material) determined by image processing of a sectional photograph of the shaped object. Image processing software for determining the sintered sectional density is Scion Image ver. 4.0.2 (freeware). In such case, it is possible to determine a sintered sectional density $\rho_S$ from the below-mentioned equation 1 by binarizing a sectional image into a sintered portion (white) and a vacancy portion (black), and then counting all picture element numbers $Px_{all}$ of the image and picture element number $PX_{white}$ of the sintered portion (white).

$$\rho s = \frac{Px_{white}}{Px_{all}} \times 100 (\%) \quad \text{[Equation 1]}$$

Examples of the embodiment where "the solidified layers are formed such that a portion thereof to which a force is applied when the three-dimensional shaped object is used consists of the high-density portion whose solidified density is 95 to 100% and the other portion consists of the low-density portion whose solidified density is 0 to 95% (excluding 95%)" are as follows ("metal powder" is used as the powder by way of example):

(High-Density Portion Formed in Part of Surface of Shaped Object)

Figure 10:
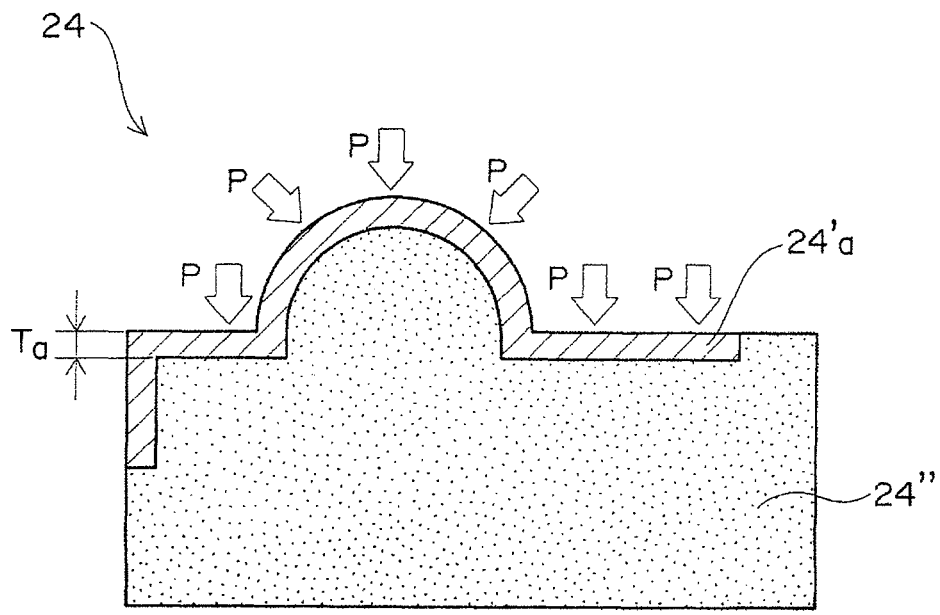
FIG. 10 is a schematic view showing an embodiment of a high-density portion formed in a part of a surface of a shaped object.

The embodiment of "high-density portion formed in a part of a surface of the shaped object" is shown in FIG. 10. As shown in FIG. 10, the high-density portion 24' a is formed only at a surface region of the three-dimensional shaped object 24, to which a force P is applied when the shaped object 24 is used. For example, when the three-dimensional shaped object is used as a metal mold, the high-density portion formed in a part of the surface region of the shaped object can correspond to an inner surface of the metal mold (i.e., a molded surface which constitutes a cavity space). In this case, the solidified density of the high-density portion is preferably in the range of about 98% to 100%, and the thickness Ta (see FIG. 10) of the high-density portion is preferably in the range of about 0.5 to 5 mm. While on the other hand, the solidified density of the low-density portion 24" is preferably in the range of about 70 to 90%.

(High-Density Portion Formed at Surface Boundary with Respect to Surface of Base Plate)

Figure 11:
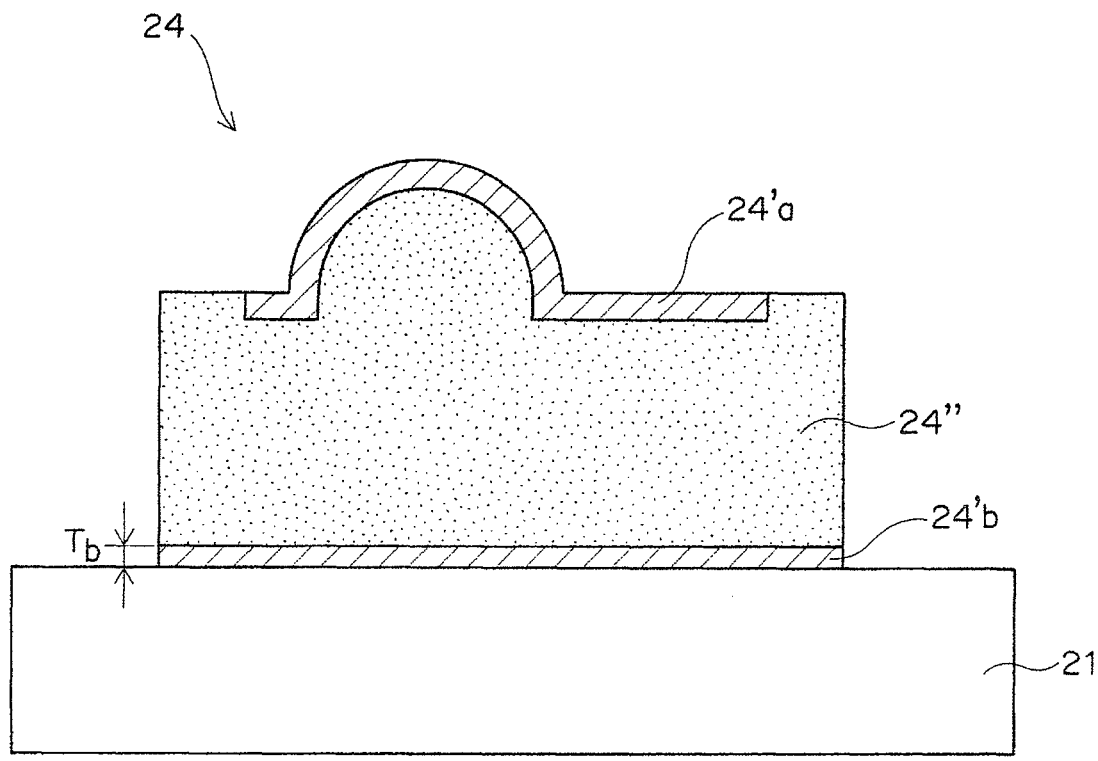
FIG. 11 is a schematic view showing an embodiment of a high-density portion formed at the surface boundary with respect to a surface of base plate for shaped object.

The embodiment of "high-density portion formed at a surface boundary with respect to a surface of a base plate for shaped object" is shown in FIG. 11. When the three-dimensional shaped object 24 integrated with the base plate for shaped object 21 is used as a product without separating them from each other as shown in FIG. 11, the high-density portion 24'b may be formed in the portion which is in contact with the base plate for shaped object 21. In other words, when the three-dimensional shaped object integrated with the base plate for shaped object is used, it is necessary to make the joint surface between the shaped object and the base plate more strong. To this end, the joint strength is increased by applying a higher energy to the joint portion, thereby configuring to be "melting". In this embodiment, the solidified density of the high-density portion 24' b is preferably in the range of 98% to 100%, and the thickness Tb (see FIG. 11) of the high-density portion 24'b may be comparatively thin and thus is preferably in the range of about 0.05 to 0.3 mm. While on the other hand, the solidified density of the low-density portion 24" is preferably in the range of about 70 to 90%. When the three-dimensional shaped object is used as a metal mold, the high-density portion can be formed in not only the portion 24' b which is in contact with the base plate for shaped object, but also the portion 24' a which corresponds to a cavity-forming surface of the metal mold (see FIG. 11).

(Cell Structure or Truss Structure)

Figure 12:
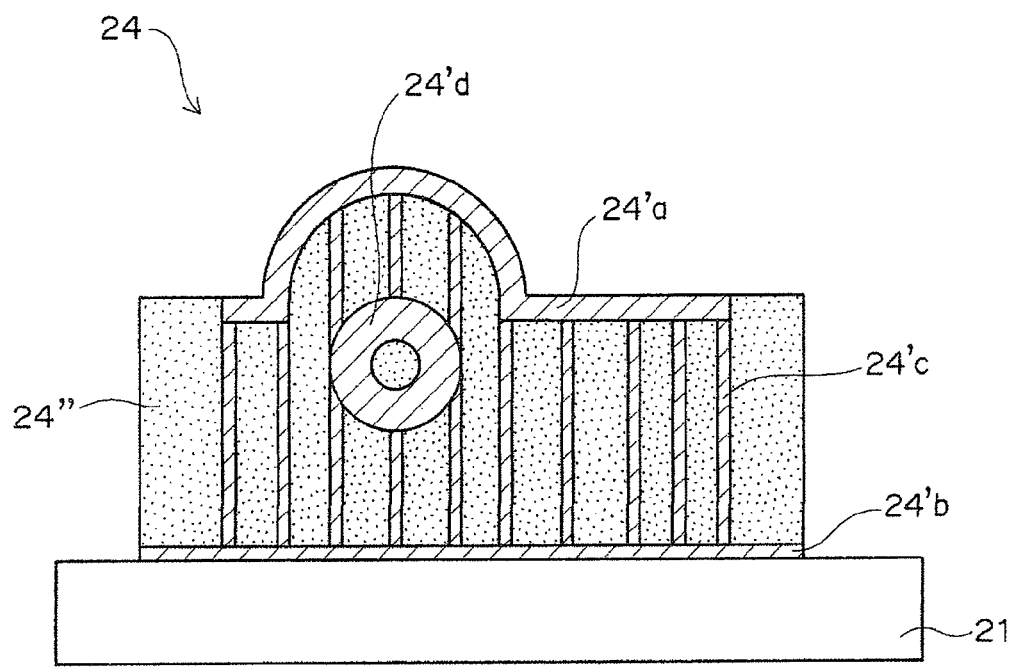
FIG. 12 is a schematic view showing an embodiment of a high-density portion formed such that a shaped object has a cell structure or a truss structure.
Figure 13:
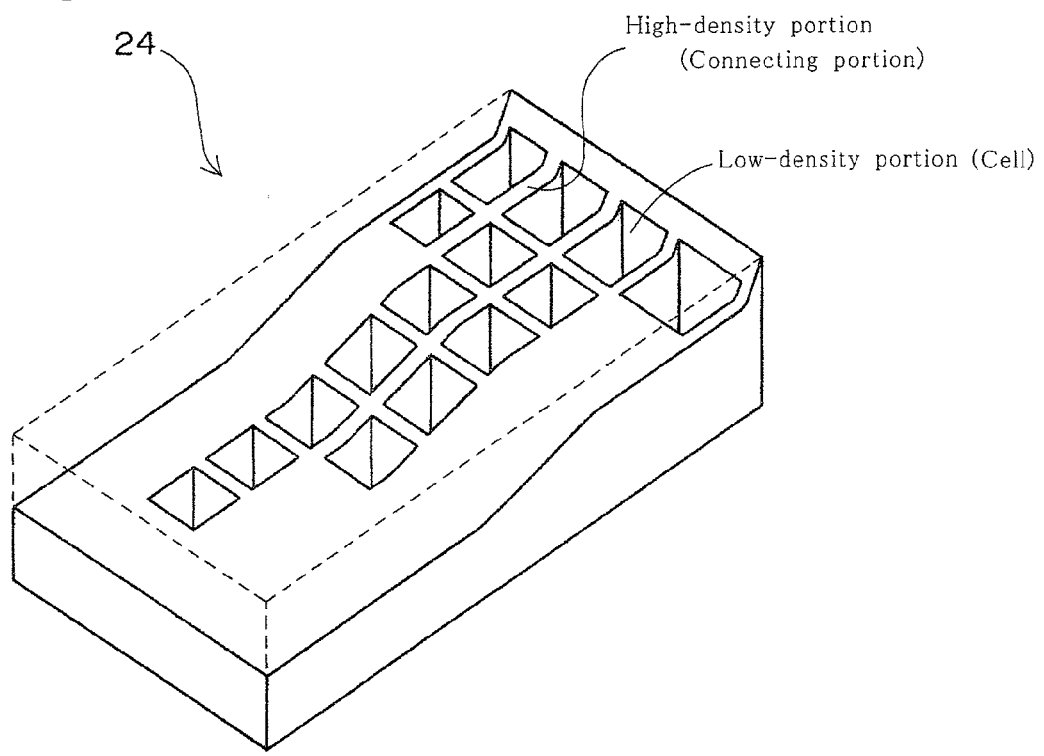
FIG. 13 is a perspective view of three-dimensional shaped object, which schematically shows an embodiment of a cell structure.
Figure 14:
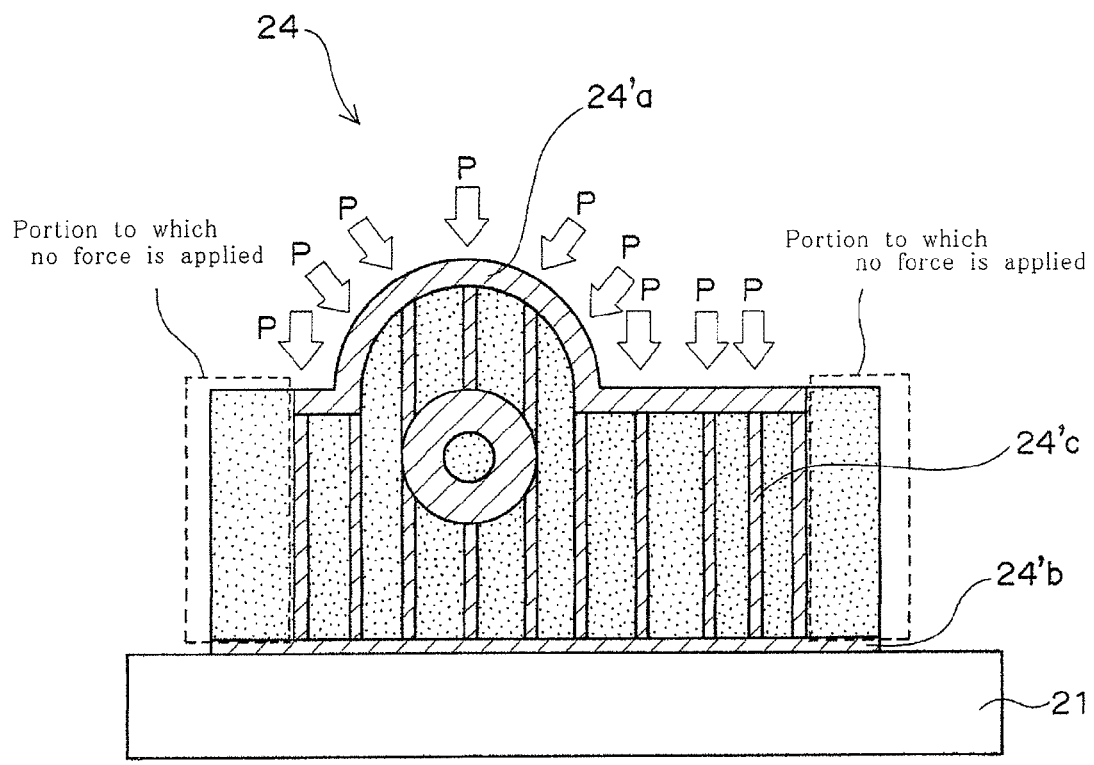
FIG. 14 is a schematic view showing an embodiment, showing a high-density portion formed such that a shaped object has a cell structure or a truss structure, wherein the position to which a force is applied is reinforced.

The embodiment of "cell structure or truss structure" is shown in FIG. 12 or FIG. 13. As shown in FIG. 12 or FIG. 13, when the three-dimensional shaped object integrated with the base plate is used as a product without separating them from each other, at least one high-density portion 'c' (24'c) may be formed in the interior portion of the three-dimensional shaped object such that the "high-density portion 'a' (24'a) formed in a part of the surface region of the shaped object" and the "high-density portion 'b' (24'b) formed in the portion of the shaped object, the portion being in contact with the base plate" are connected to each other. In this case, since the joint portion between the high-density portion 'a' and the high-density portion 'c' becomes more strong with respect to the external force, the high-density portion 'c' can function as a reinforced portion. In other words, as shown in FIG. 14, when the surface region to which a force P is applied when the three-dimensional shaped object is used locally exists, such local portion is provide as "joint portion between the high-density portion 'a' (24'a) and the high-density portion 'c' (24'c)". As shown in FIG. 12, when the high-density portion 'c' (24'c) is formed so that it is connected to the high-density portion 'd' (24'd) ("high-density portion d" will be described below) which corresponds to a wall of a cooling water channel of a metal mold, it becomes possible to more effectively transfer the heat (=low heat) from the cooling water to the entire metal mold (particularly, a cavity-forming surface of the metal mold).

(High-Density Portion formed in Part of Interior of Shaped Object)

Figure 15:
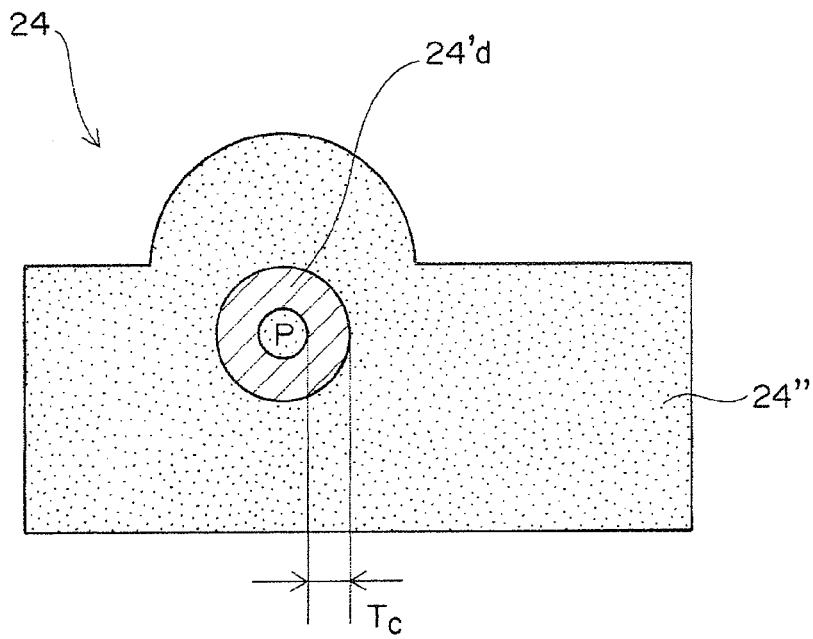
FIG. 15 is a schematic view showing an embodiment of a high-density portion formed in a part of the interior of a shaped object.
Figure 16:
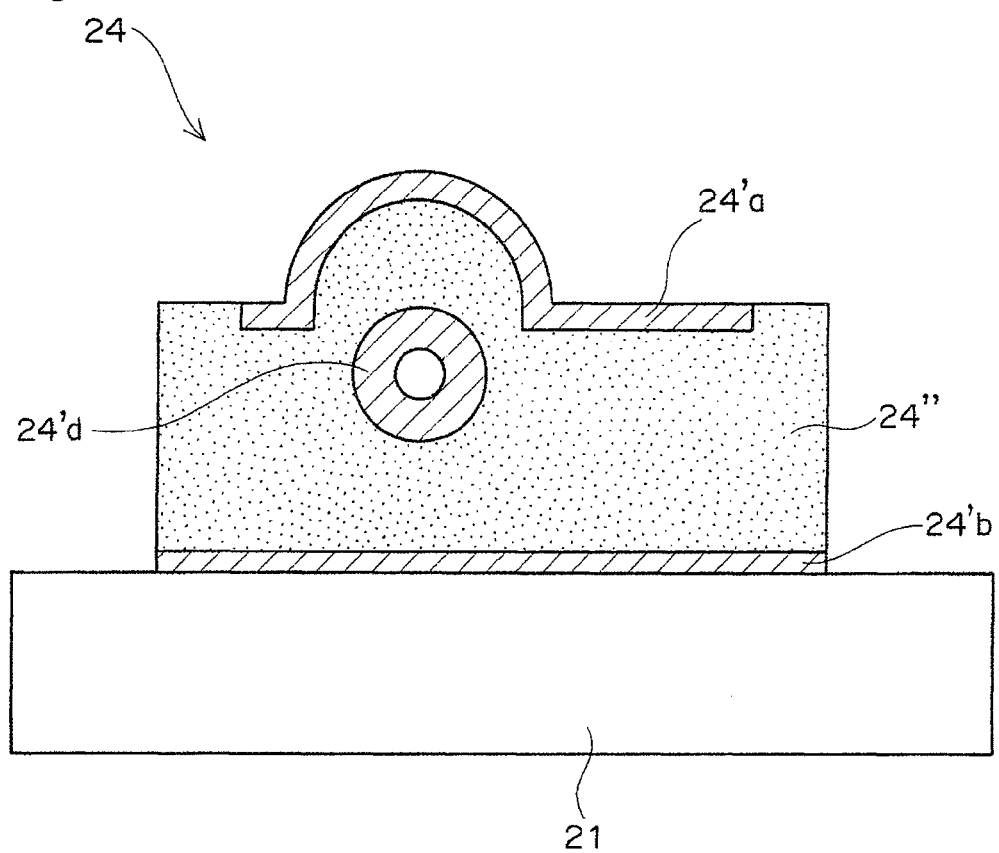
FIG. 16 is a schematic view showing a typical embodiment of a three-dimensional shaped object (metal mold) integrated with a base plate for shaped object.
Figure 17:
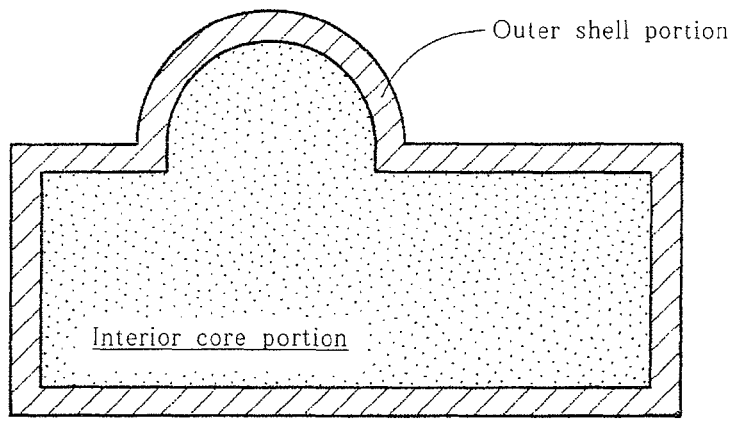
FIG. 17 is a schematic view showing an embodiment of a three-dimensional shaped object of the prior art (JP-T-8-504139).

The embodiment of "high-density portion formed in a part of the interior of the shaped object" is shown in FIG. 15. As shown in FIG. 15, a high-density portion 24'd is formed only in interior portion of the three-dimensional shaped object 24, to which a force P is applied when the shaped object is used. For example, when the three-dimensional shaped object is used as the metal mold, the high-density portion 24'd formed in a part of the interior portion can correspond to a wall of a cooling water channel of the metal mold. In other words, when the cooling water (i.e., coolant) flows in the interior of the metal mold through the cooling water channel portion, a fluid pressure ("hydraulic pressure") attributable to the cooling water is generated. In this regard, it is possible to avoid a trouble such as liquid leak attributable to the fluid pressure by applying a higher energy to the portion, thereby configuring to be "melting". In this case, the solidified density of the high-density portion 24'd is preferably in the range of about 98% to 100%, and the thickness Tc (see FIG. 15) of the high-density portion 24'd is preferably increased, comparatively, and thus is preferably in the range of about 2 to 5 mm. While on the other hand, the solidified density of the low-density portion 24" is preferably in the range of about 70 to 90%. When the three-dimensional shaped object integrated with the base plate is used as a metal mold, the high-density portion is formed in not only the interior portion 24'd of the shaped object, but also the "portion 24'a of the shaped object, the portion 24'a corresponding to a cavity-forming surface of the metal mold" and the "portion 24'b which is in contact with the base plate for shaped object" (see FIG. 16).

(High-Density Portion Formed in Heat Transfer Region)

In the embodiment of "high-density portion formed in a heat transfer region", a high-density portion is formed only in the portion corresponding to a heat transfer portion when a three-dimensional shaped object is used. In other words, when a heat exchange is performed through the surface of the shaped object, the surface being in contact with a substance having a high temperature or a low temperature, such surface region is configured to be "melting". The high-density portion has not only high strength, but also high thermal conductivity, and thereby providing an effective thermal efficiency. For example, when the high-density portion corresponds to a wall of a cooling water channel 24'd of a metal mold (see FIG. 12), it becomes possible for such high-density portion to not only impart the strength capable of enduring a pressure of the cooling water to the metal mold, but also to transfer the heat (i.e., low heat) from the cooling water to the entire metal mold more effectively.

Although a few embodiments of the present invention have been hereinbefore described, the present invention is not limited to these embodiments. It will be readily appreciated by those skilled in the art that various modifications are possible without departing from the scope of the present invention.

It should be noted that the present invention as described above includes the following aspects:

The first aspect: A method for manufacturing a three-dimensional shaped object, the method comprising the repeated steps of:

(i) forming a solidified layer by irradiating a predetermined portion of a powder layer on a base plate for the shaped object with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam;

wherein the solidified layers are formed such that they have a high-density portion whose solidified density is 95 to 100% and a low-density portion whose solidified density is 0 to 95% (excluding 95%); and wherein the high-density portion is a portion of the three-dimensional shaped object, to which the force is applied when the three-dimensional shaped object is used.

The second aspect: The method according to the first aspect, wherein the high-density portion is formed due to a complete melting of the powder in the predetermined portion.

The third aspect: The method according to the first or second aspect, wherein the low-density portion has the solidified density of 70 to 90%.

The fourth aspect: The method according to any one of the first to third aspects, wherein the high-density portion is formed in a part of the surface region of the three-dimensional shaped object.

Fifth aspect: The method according to any one of the first to fourth aspects, wherein the high-density portion is formed in a portion of the three-dimensional shaped object, the portion being in contact with the base plate.

Sixth aspect: The method according to anyone of the first to third aspects, wherein the high-density portion is formed in a part of the interior portion of the three-dimensional shaped object.

Seventh aspect: The method according to the fifth aspect depending on the fourth aspect, wherein at least one high-density portion "c" is formed in a part of the interior portion of the three-dimensional shaped object so that the high-density portion "a" formed in a part of the surface region of the three-dimensional shape and the high-density portion "b" formed in a portion of the three-dimensional shaped object are connected to each other via the high-density portion "c"

Eighth aspect: The method according to any one of the first to seventh aspects, wherein the high-density portion is formed in a heat-transfer portion of the three-dimensional shaped object in use.

Ninth aspect: A three-dimensional shaped object obtained by the method according to the fourth aspect, wherein the three-dimensional shaped object is used as a metal mold, and said part of the surface region of the three-dimensional shaped object corresponds to a cavity-forming surface of the metal mold.

Tenth aspect: A three-dimensional shaped object obtained by the method according to the sixth aspect, wherein the three-dimensional shaped object is used as a metal mold, and said part of the interior portion of the three-dimensional shaped object corresponds to a wall of a cooling water channel of the metal mold.

Eleventh aspect: A three-dimensional shaped object obtained by the method according to the seventh aspect, wherein the three-dimensional shaped object is used as a metal mold, and a joint portion of the high-density portions "a" and the high-density portion "c" is a portion of the three-dimensional shaped object, to which the force is applied when the three-dimensional shaped object is used.

INDUSTRIAL APPLICABILITY

The method for manufacturing a three-dimensional shaped object according to present invention can produce various kinds of objects. For example in a case where the powder layer is a metal powder layer (inorganic powder layer) and thus the solidified layer corresponds to a sintered layer, the produced three-dimensional shaped object can be used as a metal mold for a plastic injection molding, a press molding, a die casting, a casting or a forging. While on the other hand in a case where powder layer is a resin powder layer (organic powder layer) and thus the solidified layer corresponds to a cured layer, the produced three-dimensional shaped object can be used as a resin molded part.

CROSS REFERENCE TO RELATED PATENT APPLICATION

The present application claims the right of priority of Japanese Patent Application No. 2009-40860 (filed on Feb. 24, 2009, the title of the invention: "METHOD FOR MANUFACTURING THREE-DIMENSIONAL SHAPED OBJECT AND THREE-DIMENSIONAL SHAPED OBJECT OBTAINED BY THE SAME"), the disclosure of which is incorporated herein by reference.

The invention claimed is:

1. A method for manufacturing a three-dimensional shaped object, the method comprising the repeated steps of:
(i) forming a solidified layer by irradiating a predetermined portion of a powder layer on a base plate with a light beam, thereby allowing a sintering of the powder in the predetermined portion or a melting and subsequent solidification thereof; and
(ii) forming another solidified layer by newly forming a powder layer on the resulting solidified layer, followed by the irradiation of a predetermined portion of the powder layer with the light beam;
wherein the solidified layers are formed such that they have high-density portions whose solidified density is 95 to 100% and a low-density portion whose solidified density is 0 to 95% (excluding 95%); and
wherein one of the high-density portions is a portion of the three-dimensional shaped object, to which the force is applied when the three-dimensional shaped object is used, and the other of the high-density portions is a heat-transfer portion of the three-dimensional shaped object in use; and
wherein the portion to which the force is applied when the three-dimensional shaped object is used and the heat-transfer portion of the three-dimensional shaped object in use are connected each other via a high-density sintered portion.

2. The method according to claim 1, wherein the high-density portion is formed due to a complete melting of the powder in the predetermined portion.

3. The method according to claim 1, wherein the low-density portion has the solidified density of 70 to 90%.

4. The method according to claim 1, wherein the high-density portion is formed in a part of the surface region of the three-dimensional shaped object.

5. The method according to claim 1, wherein the high-density portion is formed in a portion of the three-dimensional shaped object, the portion being in contact with the base plate.

6. The method according to claim 1, wherein the high-density portion is formed in a part of the interior portion of the three-dimensional shaped object.

7. The method according to claim 1, wherein the high-density portion "a" is formed in a part of the surface region of the three-dimensional shape, whereas the high-density portion "b" is formed in a portion of the three-dimensional shaped object, the portion "b" being in contact with the base plate; and at least one high-density portion "c" is formed in a part of the interior portion of the three-dimensional shaped object so that the high-density portion "a" and the high-density portion "b" are connected to each other via the high-density portion "c";

the high-density portions "a" and "b" are the portions of the three-dimensional shaped object, to which the force is applied when the three-dimensional shaped object is used, whereas the high-density portion "c" is the heat-transfer portion of the three-dimensional shaped object in use.

8. A three-dimensional shaped object obtained by the method according to claim 4, wherein the three-dimensional shaped object is used as a metal mold, and said part of the surface region of the three-dimensional shaped object corresponds to a cavity-forming surface of the metal mold.

9. A three-dimensional shaped object obtained by the method according to claim 6, wherein the three-dimensional shaped object is used as a metal mold, and said part of the interior portion of the three-dimensional shaped object corresponds to a wall of a cooling water channel of the metal mold.

10. A three-dimensional shaped object obtained by the method according to claim 7, wherein the three-dimensional shaped object is used as a metal mold, and a joint portion of the high-density portion "a" and the high-density portion "c" is a portion of the three-dimensional shaped object, to which the force is applied when the three-dimensional shaped object is used.

\* \* \* \* \*